United States Patent
Truong et al.

(10) Patent No.: US 10,878,800 B2
(45) Date of Patent: Dec. 29, 2020

(54) METHODS AND SYSTEMS FOR PROVIDING CHANGES TO A VOICE INTERACTING WITH A USER

(71) Applicant: Capital One Services, LLC, McLean, VA (US)

(72) Inventors: Anh Truong, Champaign, IL (US);
Mark Watson, Philadelphia, PA (US);
Jeremy Goodsitt, Champaign, IL (US);
Vincent Pham, Champaign, IL (US);
Fardin Abdi Taghi Abad, Champaign, IL (US); Kate Key, Effingham, IL (US); Austin Walters, Savoy, IL (US);
Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/425,248

(22) Filed: May 29, 2019

(65) Prior Publication Data
US 2020/0380950 A1 Dec. 3, 2020

(51) Int. Cl.
| | |
|---|---|
| *G10L 21/00* | (2013.01) |
| *G10L 17/00* | (2013.01) |
| *G06F 3/00* | (2006.01) |
| *G10L 13/027* | (2013.01) |
| *G06F 21/32* | (2013.01) |
| *G10L 13/033* | (2013.01) |

(52) U.S. Cl.
CPC ............ *G10L 13/027* (2013.01); *G06F 21/32* (2013.01); *G10L 13/0335* (2013.01); *G10L 17/00* (2013.01)

(58) Field of Classification Search
CPC ......... G10L 21/06; G10L 13/00; G10L 21/00; G10L 15/22; G06F 3/00
See application file for complete search history.

(56) References Cited

U.S. PATENT DOCUMENTS

| | | | | |
|---|---|---|---|---|
| 5,933,805 | A * | 8/1999 | Boss | G10L 19/0018 |
| | | | | 704/207 |
| 6,377,925 | B1 | 4/2002 | Greene, Jr. | |
| 6,507,643 | B1 | 1/2003 | Groner | |
| 7,133,513 | B1 | 11/2006 | Zhang | |
| 7,457,757 | B1 * | 11/2008 | McNeill | G10L 21/0208 |
| | | | | 704/500 |
| 8,457,688 | B2 | 6/2013 | Stenmark | |
| 10,303,428 | B2 * | 5/2019 | Yang | G06F 3/165 |
| 10,303,963 | B1 | 5/2019 | Edwards et al. | |

(Continued)

OTHER PUBLICATIONS

Schindler, et al., "Recognizing Emotions Expressed by Body Pose: a Biologically Inspired Neural Model", Neural Networks, 2008, 20 pages.

(Continued)

*Primary Examiner* — Shreyans A Patel
(74) *Attorney, Agent, or Firm* — DLA Piper LLP US

(57) ABSTRACT

According to one aspect of the present disclosure, a computer-implemented method for changing a voice interacting with a user can be provided. Identity information for a user can be received. The identity information can be analyzed to identify the user. Voice change information for the user indicating help for the user to understand the voice can be retrieved. A change to be made to the voice based on retrieved user information can be made. The changed voice can be provided to the user.

20 Claims, 7 Drawing Sheets

(56) References Cited

U.S. PATENT DOCUMENTS

| | | | |
|---|---|---|---|
| 10,333,934 B1 | 7/2019 | Fox et al. | |
| 10,339,508 B1 | 7/2019 | Wurmfelf | |
| 10,446,158 B1 | 10/2019 | Edwards et al. | |
| 10,509,949 B1 | 12/2019 | Mossoba et al. | |
| 2002/0198716 A1 | 12/2002 | Zimmerman | |
| 2005/0267761 A1 | 12/2005 | Ueno | |
| 2005/0286705 A1* | 12/2005 | Contolini | H04M 3/5232 379/265.02 |
| 2009/0171670 A1* | 7/2009 | Bailey | G10L 21/06 704/278 |
| 2010/0216511 A1* | 8/2010 | Stenmart | H04M 1/6016 455/563 |
| 2011/0092187 A1 | 4/2011 | Miller | |
| 2011/0208523 A1 | 8/2011 | Kuo | |
| 2012/0251985 A1 | 10/2012 | Steels | |
| 2013/0079061 A1 | 3/2013 | Jadhav | |
| 2014/0046661 A1 | 2/2014 | Bruner | |
| 2016/0062987 A1 | 3/2016 | Yapamanu et al. | |
| 2016/0210982 A1* | 7/2016 | Sherman | G10L 21/003 |
| 2017/0206913 A1* | 7/2017 | Nahman | G10L 21/007 |
| 2017/0309269 A1* | 10/2017 | Baba | G10L 13/00 |
| 2018/0277132 A1* | 9/2018 | LeVoit | G10L 25/51 |
| 2018/0302687 A1 | 10/2018 | Bhattacharjee | |
| 2019/0164544 A1* | 5/2019 | Friedman | G10L 15/22 |

OTHER PUBLICATIONS

Lopes, et at., "Facial expression recognition with Convolutional Neural Networks: Coping with few data and the training sample order", Pattern Recognition, Jul. 21, 2016, 54 pages.

Pigou, et al., "Sign Language Recognition using Covolutional Neural Networks", European Conference on Computer Vision, 2014, 8 pages.

Farivar, et al., "Dynamic Vocabulary Customization in Automated Voice Systems", U.S. Appl. No. 16/168,480, filed Oct. 23, 2018, 48 pages.

Wikipedia, "Biometrics", https://en.wikipedia.org/wiki/Biometrics, Apr. 17, 2019, 16 pages.

Jain ,et al., "An Introduction to Biometrics", Proceedings of 19th International Conference on Pattern Recognition, 2008, 1 page.

Wikipedia, "Speaker recognition", https://en.wikipedia.org/wiki/Speaker_recognition, Apr. 17, 2019, 5 pages.

Beigi, "Fundamentals of Speaker Recognition", 2011, Springer US, 983 pages.

Wikipedia, "Convolutional neural network", https://en.wikipedia.org/wiki/Convolutional_neural_network, Apr. 17, 2019, 23 pages.

Wikipedia, "Recurrent neural network", https://en.wikipedia.org/wiki/Recurrent_neural_network, Apr. 17, 2019, 16 pages.

Yann, et al., "Convolutional networks for images, speech, and time series", The handbook of brain theory and neural networks, 1995, 14 pages.

Reed, et al., "Generative Adversarial Text to Image Synthesis", Proceedings of the 33rd International Conference on Machine Learning, vol. 48, 2016, 10 pages.

Goodfellow, et al., "Generative Adversarial Nets", Proceedings of Advances in Neural Information Processing Systems, 2014, 9 pages.

Wikipedia, "Generative adversarial network", https://en.wikipedia.org/wiki/Generative_adversarial_network, Apr. 23, 2019, 7 pages.

Xiong et al., "Learning to generate time-lapse videos using multi-stage dynamic generative adversarial networks." Proceedings of the IEEE Conference on Computer Vision and Pattern Recognition. (Year: 2018).

Pending U.S. Appl. No. 16/168,480, filed Oct. 23, 2018.

\* cited by examiner

US 10,878,800 B2

METHODS AND SYSTEMS FOR PROVIDING CHANGES TO A VOICE INTERACTING WITH A USER

CROSS-REFERENCE TO RELATED APPLICATIONS

This application is related to U.S. patent application Ser. No. 16/425,347, which is titled "Methods And Systems For Providing Images For Facilitating Communication", filed May 29, 2019, the content of which is incorporated herein by reference in it is entirety.

FIELD

The present disclosure relates generally to changing voices interacting with a user.

BACKGROUND

When a live voice or recorded voice is interacting with people, there is a need to make changes to the voice to make the voice easier to understand.

SUMMARY

Aspects of the present disclosure may include a computer-implemented method for providing changes to a voice interacting with a user. A computer system can: receive identity information for a user; analyze the identity information to identify the user; retrieve user information for an identified user, the user information indicating help for the identified user to understand the voice; identify a change to be made to the voice based on retrieved user information. Using a voice changer, the voice can be changed as identified by the retrieved user information. The computer system can provide the changed voice to interact with the identified user.

According to some aspects, the voice changer can change: a frequency of the voice; intonation of the voice; an accent of the voice; volume of the voice; or language of the voice; or any combination thereof.

According to some aspects, the computer system can be configured for: receiving physiological information and/or behavioral information from the user; providing the physiological information and/or the behavioral information to an identification system; and identifying the user based on the physiological information and/or behavioral information.

According to some aspects, the behavioral information can comprise user voice data and/or user signature data. The physiological biometric data can comprise: iris data; retina data; eye vein data; fingerprint data; hand geometry data; facial data; or finger vein data; or any combination thereof.

According to some aspects, a system for providing changes to a voice interacting with a user can include: a memory storing instructions; and a processor that, when executing the instructions, can be configured to: receive physiological information and/or behavioral information for the user representing identifying information about a user; analyze the physiological information and/or the behavioral information for the user to determine an identity of the user; retrieve help information for an identified user, the help information indicating a change to the voice to be made for the user to understand the voice, the change comprising: a frequency change, an accent change, an intonation change, a volume change, or a language change, or any combination thereof. A voice changer can be provided that is configured to change the voice based on retrieved help information.

According to some aspects, the physiological information can include: iris data; retina data; eye vein data; fingerprint data; hand geometry data; facial data; or finger vein data; or any combination thereof. The behavioral information can include: user voice data and/or user signature data.

According to some aspects, the processor can be configured to: receive feedback information from the identified user, the feedback information indicating difficulty the identified user has with understanding the voice; analyze the feedback information in order to identify the help information; and store the feedback information as the help information for the identified user. According to some aspects, the feedback information can include survey information.

According to some aspects, the processor can be configured to: receive feedback information comprising body language information for the identified user; determine if the body language information signifies: an inability to understand the voice, a misunderstanding of the voice, or displeasure with a user experience, or any combination thereof; analyze the body language information for the identified user in order to identify the help information; and store the help information for the identified user.

According to some aspects, the processor can be configured to: receive feedback information comprising language spoken by the identified user; determine if the language spoken by the identified user comprises pre-defined words signifying: an inability to understand the voice, a misunderstanding of the voice; or displeasure with a user experience, or any combination thereof; analyze the language spoken by the identified user in order to identify the help information; and store the help information for the identified user.

According to some aspects, a device for providing changes to a voice interacting with a user can include: a memory storing instructions; a voice changer; and a processor that, when executing the instructions, is configured to: receive identifying information for a user; analyze the identifying information for the user to identify the user; retrieve help information for an identified user, the help information indicating a change to make to the voice to allow the user to understand the voice. The voice changer can change the voice based on retrieved help information.

According to some aspects, the voice changer can be configured to retrieve voice frequency change information indicating a frequency change to make to frequency components of the voice for an identified user; and reduce a magnitude of the frequency components of the voice according to the voice frequency change information. The magnitude of the frequency components of the voice can be reduced via: a low-pass filter for pre-defined low frequencies, a high-pass filter for pre-defined high frequencies, or a band-pass filter pre-defined middle frequencies, or any combination thereof. Cut-off frequencies for the low-pass filter, the high-pass filter, or the band-pass filter, or any combination thereof, can be determined so that a changed voice has a signal-to-noise ratio (SNR) over a predefined threshold.

According to some aspects, the voice changer can: retrieve accent change information indicating an accent change to make to an accent of the voice; and switch to an agent with an accent more acceptable to the identified user, or change the accent of the voice according to the accent change information. The accent change information can include voice-text-voice translation to transcribe the voice into text and synthesize the text to speech with an accent more acceptable to the identified user.

According to some aspects, the voice changer can: retrieve intonation change information indicating an intonation change to make to an intonation of the voice; and change the intonation of the voice based on preferred intonation patterns of the user. The voice changer can change the intonation of the voice by adjusting the magnitude for words in a sentence.

According to some aspects, the voice changer can: retrieve volume change information indicating a volume change to make to a volume of the voice; and change the volume of the voice.

According to some aspects, the voice changer can: retrieve language change information indicating a language change to make to words used by the voice; and change words used by the voice.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not inclusive of all elements of a system, emphasis instead generally being placed upon illustrating the concepts, structures, and techniques sought to be protected herein.

DETAILED DESCRIPTION

Embodiments of the present disclosure may help change the voice interacting with a user. For example, when people are going to an establishment (e.g., a bank, restaurant/bar, movie theater, theme park, sports venue, music venue, etc.) or visiting an establishment's physical mobile site (e.g., a kiosk), web site or mobile device application, the user may interact with a voice. The voice may be, for example: live, in-person, remote or recorded, or any combination thereof. It would make it easier for the user to communicate if the voice that they are interacting with is changed so that the user may better understand the voice. Examples using a banking institution establishment are discussed below. However, those of ordinary skill in the art will see that the system may also be used by many other types of establishments.

Figure 1:
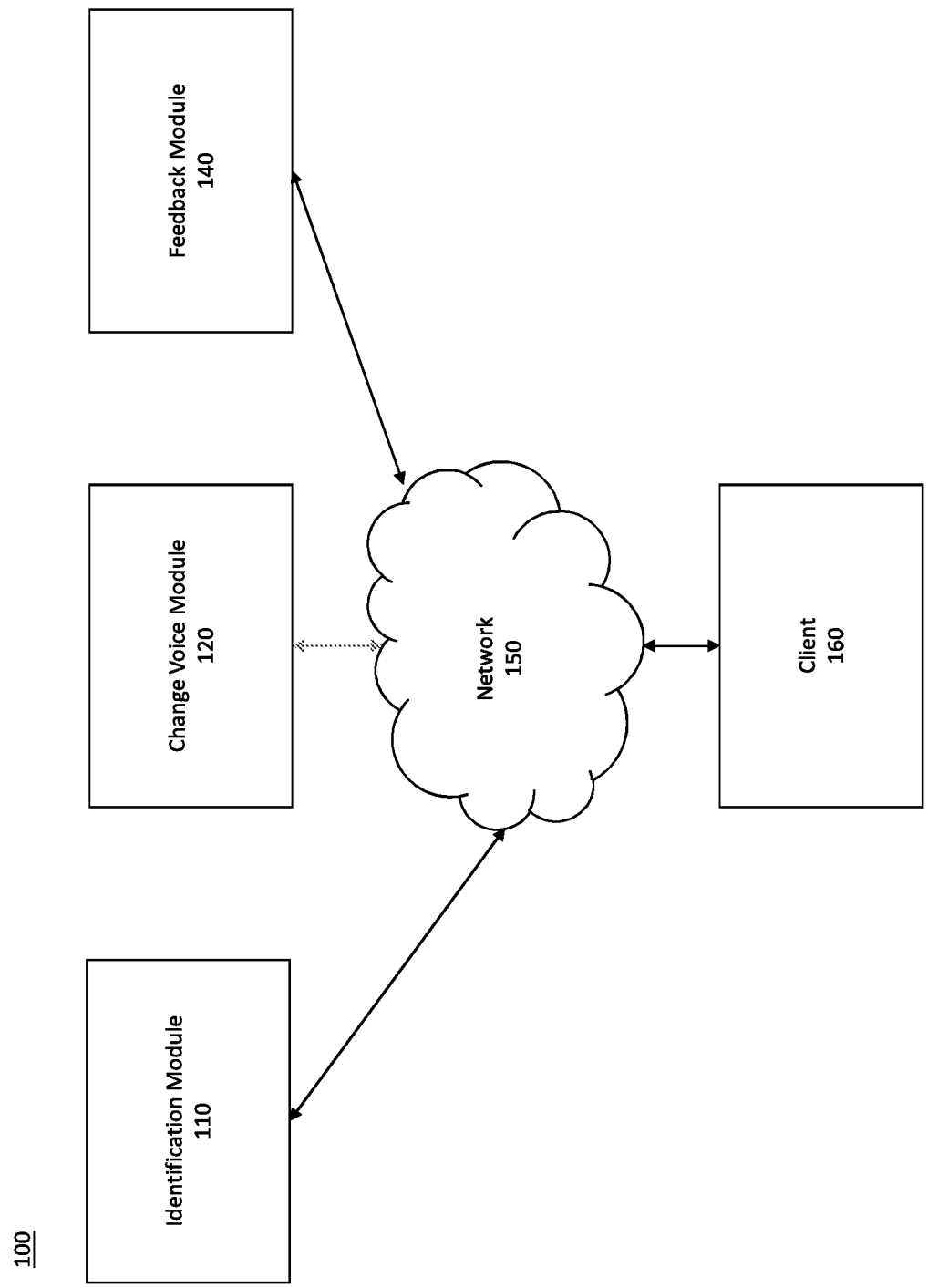
FIG. 1 is a diagram of an illustrative system 100 for changing a voice interacting with a user, according to some embodiments of the present disclosure.

FIG. 1 is a diagram of an illustrative system 100 for providing a change to a voice interacting with a user, according to some embodiments of the present disclosure. As shown in FIG. 1, a client 160 can access (e.g., over a network 150) an identification module 110, a change voice module 120, or a feedback module 140, or any combination thereof.

The identification module 110 can identify the user using analyzed identity information. In some aspects of the disclosure, a credit card, photo ID, or other type of identification can be analyzed to identify the user. In other aspects, physiological information and/or behavioral information can be received from the user and provided to an identification system, and used to identify the user. The physiological information can include: iris data; retina data; eye vein data; fingerprint data; hand geometry data; facial data; or finger vein data; or any combination thereof. Additional information on physiological identification information can be found at the Apr. 17, 2019 Biometrics Wikipedia page: https://en.wikipedia.org/wiki/Biometrics. In addition, other background information on physiological identification information can be found at Jain, A. K. et al., "An introduction to biometrics", in Proceedings of 19th International Conference on Pattern Recognition, 2008, FL, USA. These references are herein incorporated by reference in their entirety.

The behavioral information can include signature information and/or voice information (e.g., speaker recognition). Additional information on signature information can be found at the Apr. 17, 2019 Speaker Recognition Wikipedia page: https://en.wikipedia.org/wiki/Speaker_recognition. In addition, other background information on speaker recognition can be found at Beigi, H., Fundamentals of Speaker Recognition, Springer-Verlag, Berlin, 2011. These references are herein incorporated by reference in their entirety.

For example, the user can interact with a system that scans her eye, checks her fingerprint, hand, face or finger, or any combination thereof. In addition, the user can be asked to provide a signature or talk so that her signature or voice can be identified by the system.

The change voice module 120 can change the voice interacting with the user. The voice changer can be configured to retrieve voice frequency change information indicating a frequency change to make to frequency components of the voice for an identified user; and reduce a magnitude of the frequency components of the voice according to the voice frequency change information. The magnitude of the frequency components of the voice can be reduced using an equalizer via: a low-pass filter for pre-defined low frequencies, a high-pass filter for pre-defined high frequencies, or a band-pass filter pre-defined middle frequencies, or any combination thereof. Cut-off frequencies for the low-pass filter, the high-pass filter, and the band-pass filter can be determined so that a changed voice has a signal-to-noise ratio (SNR) over a predefined threshold.

The voice changer can be configured to: retrieve accent change information indicating an accent change to make to an accent of the voice; and switch to an agent with an accent more acceptable to the identified user, or change the accent of the voice according to the accent change information. The accent change information can include voice-text-voice translation to transcribe the voice into text and synthesize the text to speech with an accent more acceptable to the identified user.

The voice changer can be configured to: retrieve intonation change information indicating an intonation change to make to an intonation of the voice; and change the intonation of the voice based on preferred intonation patterns of the user. The voice changer can be configured to change the intonation of the voice by adjusting the magnitude for words in a sentence.

The voice changer can be configured to: retrieve volume change information indicating a volume change to make to a volume of the voice; and change the volume of the voice. For example, if the system detects a trend (e.g., using average windows) of the voice volume in the sentence being increased, then the voice changer can increase the volume in a similar manner. If the system detects a trend of the voice volume not being increased (e.g., either random or decreasing), the voice changer can use the average magnitude across all windows for the signal and assign that average to the middle word of the sentence. The voice changer can then increase the volume for the words after the middle word and decrease the volume of the words before the middle word.

As another example, if the user prefers a voice that is raised at the end of the sentence, then the voice changer can keep increasing the magnitude of the words in that sentence. As with the examples of volume changes above, if the system detects a trend in intonation, the voice changer can change the intonation accordingly.

The voice changer can be configured to: retrieve language change information indicating a language change to make to words used by the voice; and change words used by the voice. For example, the voice changer can translate words, sentences, phrases, etc. of the voice to another language.

The feedback module 140 can receive feedback information from or for the user. The feedback information can include: body language information for the user, language spoken by the user, or survey information, or any combination thereof. The feedback module can determine if the body language information and/or the language spoken by the user signifies: an inability to understand the voice, a misunderstanding of the voice, or displeasure with a user experience, or any combination thereof. The feedback module can analyze the body language information in order to identify help information.

The feedback module can determine any difficulty the user has with understanding the voice. The feedback module can also analyze the feedback information in order to identify help information.

Figure 2:
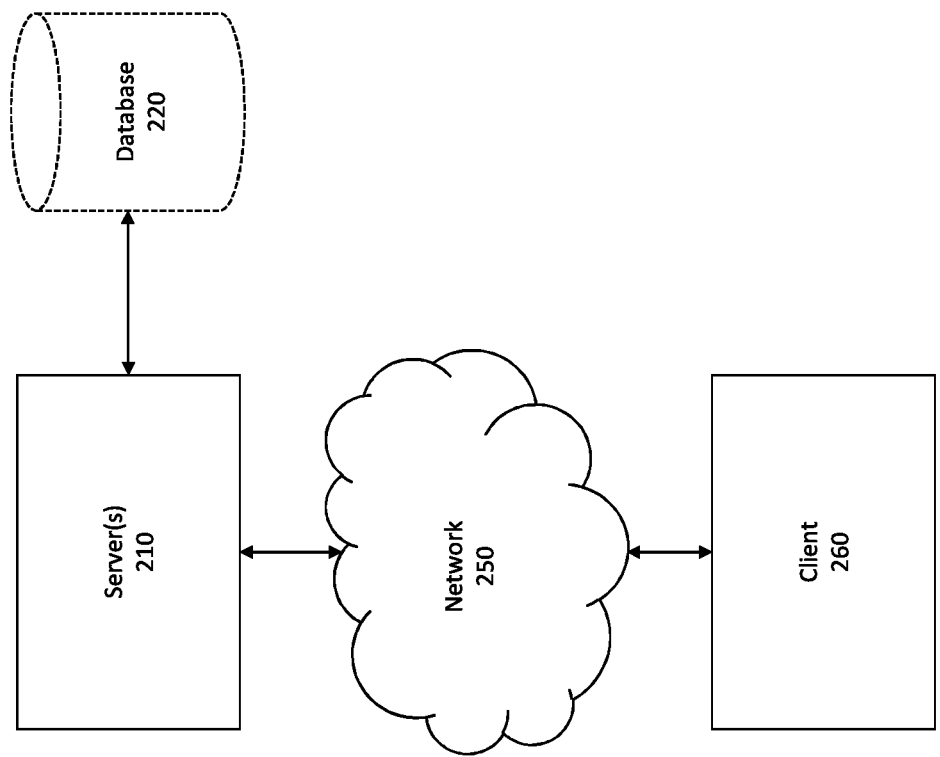
FIG. 2 is another diagram of an illustrative system 200 for changing the voice interacting with a user, according to some embodiments of the present disclosure.

FIG. 2 is another diagram of an illustrative system 200 for changing a voice interacting with a user, according to some embodiments of the present disclosure. As shown in FIG. 2, a client 260 can access (e.g., over a network 150 using server(s) 110) data representing transactions between customers and establishments stored in a database 120. The database 120 can store instructions in one or more memories.

Figure 3:
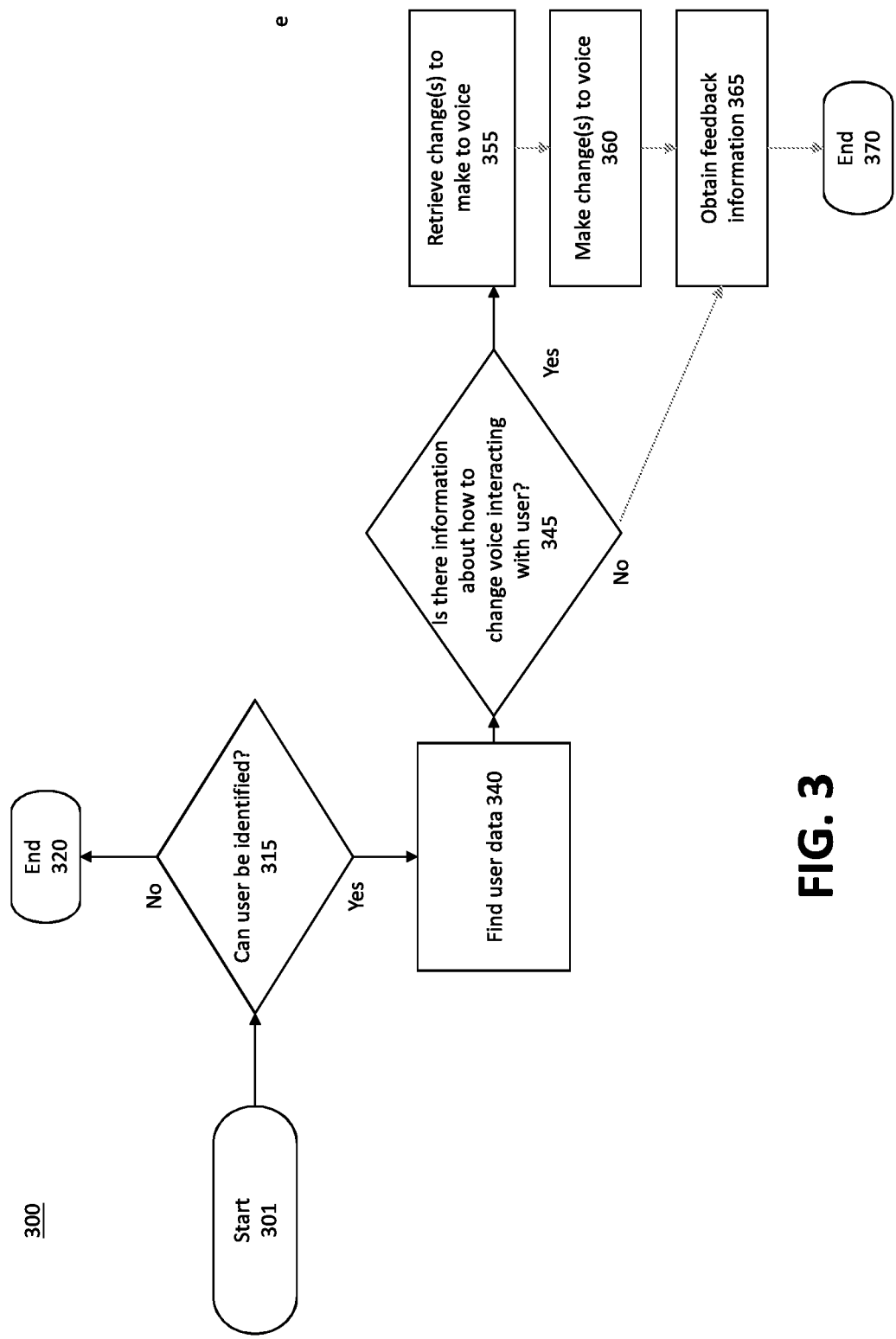
FIG. 3 is a flow diagram 300 showing processing that may occur when changing the voice interacting with a user, using the system of FIGS. 1 and/or 2, according to some embodiments of the present disclosure.

FIG. 3 is a flow diagram 300 showing processing that may occur within the system of FIG. 1 and/or FIG. 2, according to some embodiments of the present disclosure. In step 301, the process can start. In step 315, it can be determined if a user can be identified. If not, in step 320, the process can end. If yes, in step 340, user information can be found. In step 345, it can be determined if information for changing the voice to better interact with the identified user. If not, the process can move to 365. If yes, the process can move to step 355, where changes to make to the voice can be determined. In 360, the voice can be changed. In 365, feedback from the user can be obtained. In 370, the process can end.

For example, if a person approaches a customer service representative (e.g., a bank teller) in person, the person can be identified (e.g., using a driver's license, using fingerprint recognition). Once the person is identified, the system can be accessed to determine if any help records exist for the person to indicate how to better help the person understand the customer service representative. If help information exists for the person, the system can determine what changes need to be made to the voice of the customer service representative. For example, if the system determines that the person will better understand a voice if it is in a certain frequency range, and in a certain volume range, the system can adjust the customer service representative's voice to be in that frequency range and volume range. This adjusted voice can be heard by the person shortly after the customer service representative speaks, at certain pre-determined times (e.g., after a voice pause and/or after a certain amount of time (e.g., 10 seconds)).

For example, if a person approaches an automated teller machine (ATM) (e.g., a bank's ATM or a store's ATM), the person can be identified (e.g., using a credit card, using voice identification). Once the person is identified, the ATM can access the system to determine if any help records exist for the person that indicate how to better help the person understand a pre-recorded voice and/or artificial voice used by the ATM. If help information exists for the person, the system can determine what changes need to be made to the pre-recorded voice and/or artificial voice used by the ATM. For example, if the system determines that the person will better understand an English-speaking voice if it is in an English accent versus an American accent, the system can adjust the voice used by the ATM to use an English accent. This adjusted (e.g., English accent) voice can be heard by the person instead of the original (e.g., American accent) voice when the person interacts with the ATM.

Figure 4A:
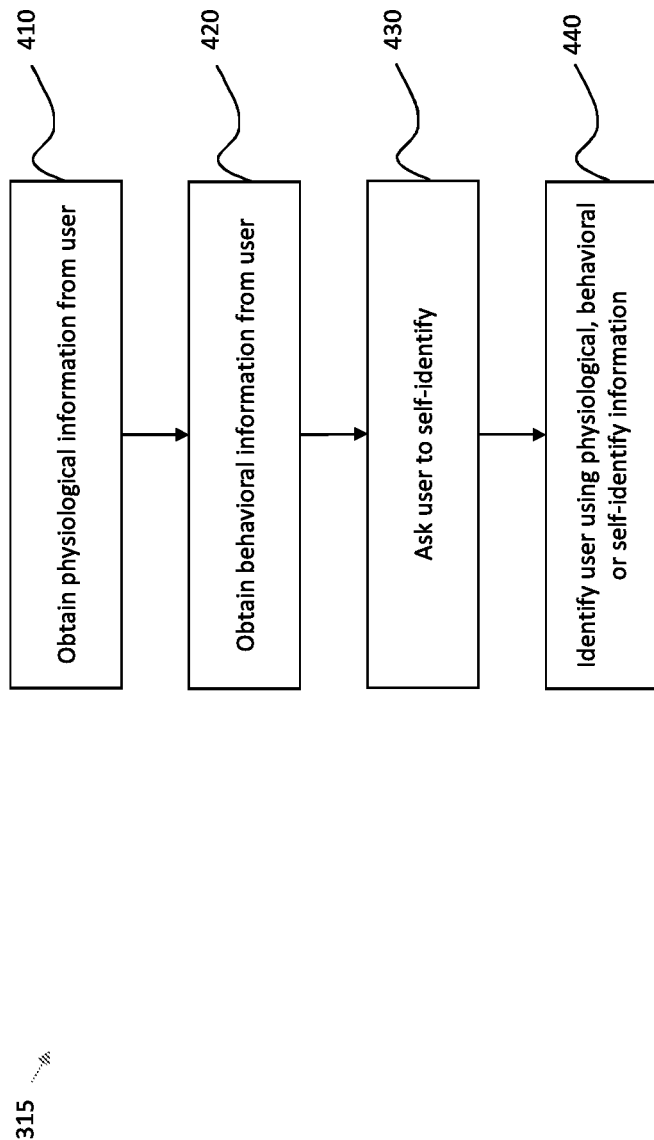
FIG. 4A is a flow diagram 315 showing processing that may occur when identifying a user using the system of FIGS. 1 and/or 2, according to some embodiments of the present disclosure.

FIG. 4A is a flow diagram showing additional processing that may occur in step 315 of flow diagram 300 of FIG. 3, according to some embodiments of the present disclosure. In 410, physiological information can be obtained from the user. In 420, behavioral information can be obtained from the user. In 430, the user can be asked to self-identify. In 440, the user can be identified using the physiological, behavioral or self-identified information.

Figure 4B:
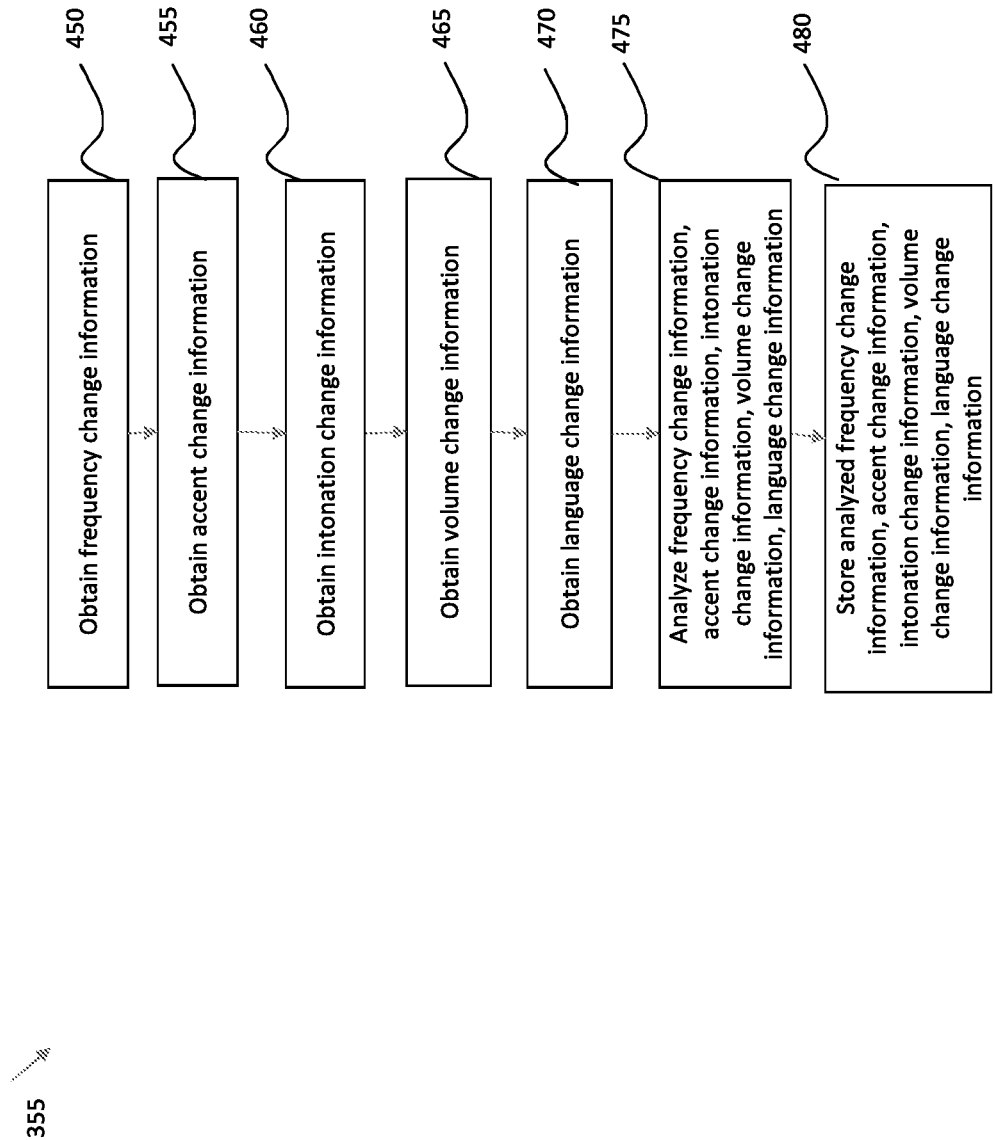
FIG. 4B illustrates a flow diagram 335 showing additional processing that may occur when changing the voice using the system of FIGS. 1 and/or 2, according to some embodiments of the present disclosure.

FIG. 4B is a flow diagram showing additional processing that may occur in step 335 of flow diagram 300 of FIG. 3, according to some embodiments of the present disclosure. In step 450, frequency change information can be obtained. In 455, accent change information may be obtained. In 460, intonation change information can be obtained. In 465, volume change information can be obtained. In 470, language change information can be obtained. In 475, the voice changer can analyze the: frequency change information, accent change information, intonation change information, volume change information, or language change information, or any combination thereof. In 480, analyzed frequency change information, accent change information, intonation change information, volume change information, or language change information, or any combination thereof, can be stored.

Figure 5:
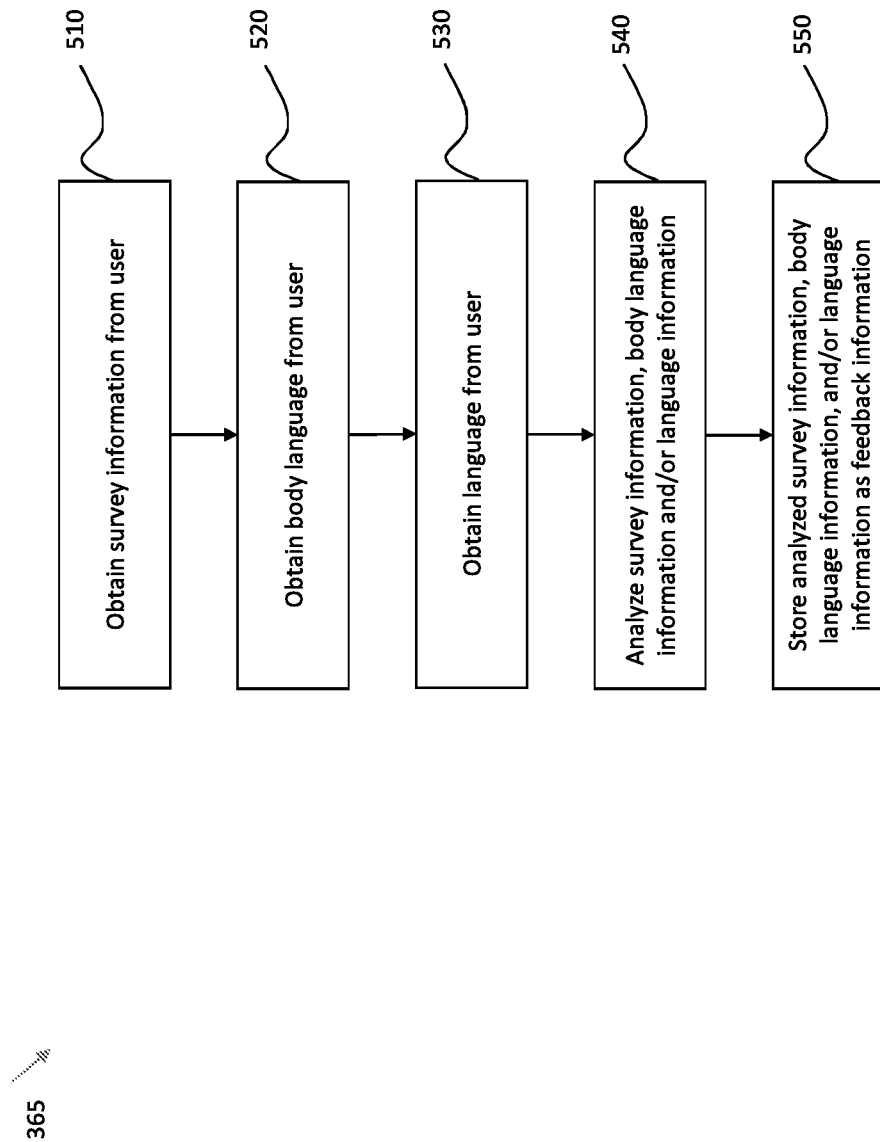
FIG. 5 illustrates a flow diagram 500 showing processing that may occur when analyzing and storing feedback information within the system of FIGS. 1 and/or 2, according to some embodiments of the present disclosure.

FIG. 5 is a flow diagram showing additional processing that may occur in step 365 of flow diagram 300 of FIG. 3, according to some embodiments of the present disclosure. In step 510, survey information can be obtained from the user. In step 520, body language (e.g., sign language, facial expression, emotion recognition) can be obtained from the user. In step 530, language can be obtained from the user. In 540, the survey information, the body language information, and/or the language information can be analyzed. In 550, the analyzed survey information, the body language information, and/or the language information can be analyzed as feedback information.

As discussed above, in some aspects, the system can detect body language feedback indicating that customers are not adequately hearing and/or understanding customer service representatives (e.g., a bank teller). The system can apply a neural network model (e.g., a convolution neural network (CNN), a recurrent neural networks (RNN)) and feed in training data. The neural network model can detect different types of feedback (e.g., positive feedback, negative feedback). For example, the training data can capture images of a person using sign language (e.g., an official sign language such as American Sign Language), a person's body expression (e.g., leaning towards a bank teller, moving ears towards a bank teller, cupping a hand around an ear, pointing a finger at an ear), facial expressions (e.g., indicating satisfied or upset), emotion recognition (e.g., head shaking), etc. In some aspects, different models can be built for different groups of people (e.g., different countries, different cultures). For example, in some countries or cultures, head shaking indicates non-understanding, whereas in other countries or cultures, head shaking indicates understanding.

Additional information on CNNs can be found at the Apr. 17, 2019 Convolution Neural Network Wikipedia page: https://en.wikipedia.org/wiki/Convolutional_neural_network. Additional information on RNNs can be found at the Apr. 17, 2019 Recurrent Neural Network Wikipedia page: https://en.wikipedia.org/wiki/Recurrent_neural_network. Other background information on CNNs and RNNs can be found at Yann, L. et al., "Convolutional networks for images, speech, and time series" in Arbib, M. The handbook of brain theory and neural networks (2nd ed.), The MIT Press, pp. 276-278 (1995). Additional information on recognizing sign language can be found in: L. Pigou et al., Sign Language Recognition using Convolutional Neural Networks, https://biblio.ugent.be/publication/5796137/file/5796322.pdf. Additional information on recognizing facial expressions can be found in: A. Lopez et al., Facial expression recognition with Convolutional Neural Networks: Coping with few data and the training sample order, https://www.sciencedirect.com/science/article/abs/pii/S0031320316301753. Additional information on recognizing emotion from a body pose can be found in: K. Schindler et al., Recognizing Emotions Expressed by Body Pose: a Biologically Inspired Neural Model, https://www.vision.ee.ethz.ch/publications/papers/articles/eth_biwi_00545.pdf. All of these references are herein incorporated by reference in their entirety.

Methods described herein may represent processing that occurs within a system for providing a change to a voice interacting with a user (e.g., system 100 of FIG. 1 and/or system 200 of FIG. 2). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 600 in FIG. 6) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 6:
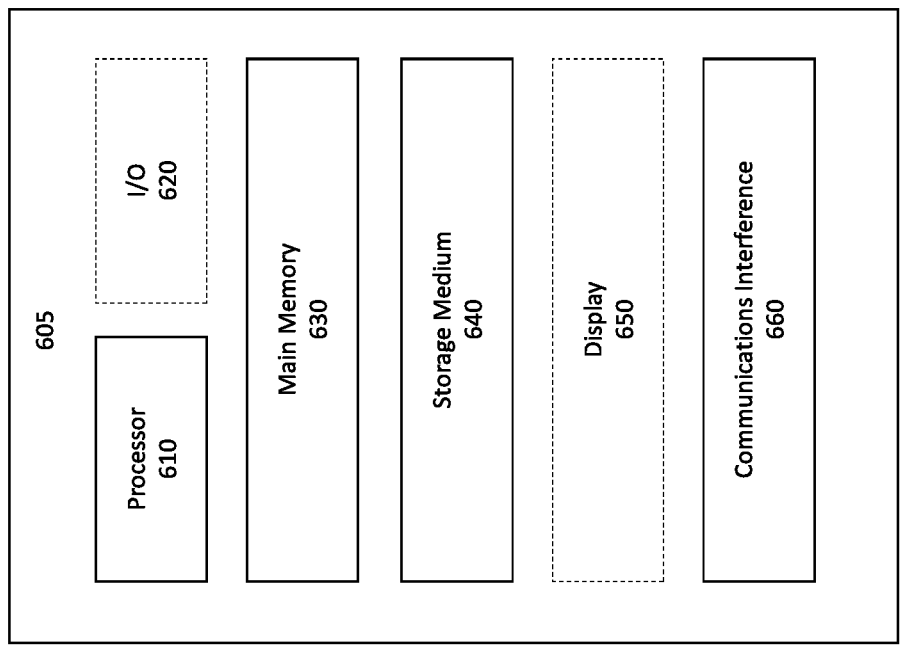
FIG. 6 illustrates an example computer 600, according to some embodiments of the present disclosure.

FIG. 6 illustrates an example computer 605, according to some embodiments of the present disclosure. Computer 605 can include a processor 610 suitable for the execution of a computer program, and can include, by way of example, both general and special purpose microprocessors, and any one or more processor of any kind of digital computer. A processor can receive instructions and data from a main memory 630 (e.g., a read only memory or a random access memory or both). Processor 610 can execute instructions and the memory 630 can store instructions and data. A computer can include, or be operatively coupled to receive data from or transfer data to, or both, a storage medium 640 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 610 and the memory 630 can be supplemented by, or incorporated in, special purpose logic circuitry. The computer 605 can also include an input/output 620, a display 650, and a communications interface 660.

In some embodiments, a voice changer 695 can be included as part of computer 605 (as shown in FIG. 6). In other aspects, the voice changer 695 can be separate from the computer 605, but in communication with the computer 605.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for providing changes to a live voice stream of a customer service representative interacting with a user, comprising:
   receiving, by a computer system, identity information for the user;
   analyzing, by the computer system, the identity information to identify the user;
   retrieving, by the computer system, user information for an identified user, the user information indicating help for the identified user to understand the live voice stream;
   identifying, by the computer system, a change to be made to the live voice stream based on retrieved user information;
   changing the live voice stream, by a computerized voice changer, as identified by the retrieved user information; and
   providing, by the computer system, a changed voice to interact with the identified user.

2. The method of claim 1, wherein the voice changer changes: a frequency of the live voice stream; intonation of the live voice stream; an accent of the live voice stream; volume of the live voice stream; or language of the live voice stream; or any combination thereof.

3. The method of claim 1, wherein the computer system is configured for:
   receiving physiological information and/or behavioral information from the user;
   providing the physiological information and/or the behavioral information to an identification system; and
   identifying the user based on the physiological information and/or the behavioral information.

4. The method of claim 3,
   wherein the behavioral information comprises user voice data and/or user signature data; and
   wherein the physiological biometric data comprises: iris data; retina data; eye vein data; fingerprint data; hand geometry data; facial data; or finger vein data; or any combination thereof.

5. A system for providing changes to a live voice stream of a customer service representative interacting with a user, comprising:
   a memory storing instructions; and
   a processor that, when executing the instructions, is configured to:
      receive physiological information and/or behavioral information for the user representing identifying information about the user;
      analyze the physiological information and/or the behavioral information for the user to determine an identity of the user;
      retrieve help information for an identified user, the help information indicating a change to the live voice stream to be made for the user to better understand the live voice stream, the change comprising: a frequency change, an accent change, an intonation change, a volume change, or a language change, or any combination thereof; and
   a voice changer that is configured to:
      change the live voice stream based on retrieved help information.

6. The system of claim 5,
   wherein the physiological information comprises: iris data; retina data; eye vein data; fingerprint data; hand geometry data; facial data; or finger vein data; or any combination thereof; and
   wherein the behavioral information comprises: user voice data and/or user signature data.

7. The system of claim 5, wherein the processor is configured to:
   receive feedback information from the identified user, the feedback information indicating difficulty the identified user has with understanding the live voice stream;
   analyze the feedback information in order to identify the help information; and
   store the feedback information as the help information for the identified user.

8. The system of claim 7, wherein the feedback information comprises survey information.

9. The system of claim 7, wherein the processor is configured to:
   receive the feedback information comprising body language information for the identified user;
   determine if the body language information signifies: an inability to understand the live voice stream, a misunderstanding of the live voice stream, or displeasure with a user experience, or any combination thereof;
   analyze the body language information for the identified user to identify the help information; and
   store the help information for the identified user.

10. The system of claim 7, wherein the processor is configured to:
   receive the feedback information comprising language spoken by the identified user;
   determine if the language spoken by the identified user comprises pre-defined words signifying: an inability to understand the live voice stream, a misunderstanding of the live voice stream; or displeasure with a user experience, or any combination thereof;
   analyze the language spoken by the identified user to identify the help information; and
   store the help information for the identified user.

11. A device for providing changes to a live voice stream of a customer service representative interacting with a user, comprising:
   a memory storing instructions;
   a voice changer; and
   a processor that, when executing the instructions, is configured to:
      receive identifying information for the user;
      analyze the identifying information for the user to identify the user;

retrieve help information for an identified user, the help information indicating a change to make to the live voice stream to allow the user to understand the live voice stream; and the voice changer configured to:

change the live voice stream based on retrieved help information.

12. The device of claim 11, wherein the voice changer is configured to:

retrieve voice frequency change information indicating a frequency change to make to frequency components of the live voice stream for an identified user; and reduce a magnitude of the frequency components of the live voice stream according to the voice frequency change information.

13. The device of claim 12, wherein the magnitude of the frequency components of the live voice stream are reduced via: a low-pass filter for pre-defined low frequencies, a high-pass filter for pre-defined high frequencies, or a band-pass filter pre-defined middle frequencies, or any combination thereof.

14. The device of claim 13, wherein cut-off frequencies for the low-pass filter, the high-pass filter, and the band-pass filter are determined so that a changed voice has a signal-to-noise ratio (SNR) over a predefined threshold.

15. The device of claim 11, wherein the voice changer is configured to:

retrieve accent change information indicating an accent change to make to an accent of the live voice stream; and switch to an agent more acceptable to the identified user, or change the accent of the live voice stream according to the accent change information.

16. The device of claim 15, wherein the accent change information comprises voice-text-voice translation to transcribe the live voice stream into text and synthesize the text to speech more acceptable to the identified user.

17. The device of claim 11, wherein the voice changer is configured to:

retrieve intonation change information indicating an intonation change to make to an intonation of the live voice stream; and change the intonation of the live voice stream based on preferred intonation patterns of the user.

18. The device of claim 11, wherein the processor is configured to detect a trend of intonation in the sentence being increased or decreased; and the voice changer increases or decreases the intonation in a similar manner.

19. The device of claim 11, wherein the processor is configured to detect a trend of volume in the sentence being increased or decreased; and the voice changer increases or decreases the volume in a similar manner.

20. The device of claim 19, wherein the processor is configured to detect the trend using average windows and use average magnitude across all windows and assign that average to a middle word of a sentence; and the voice changer increases the volume for words after the middle word and decrease the volume of the words before the middle word.

* * * * *